Figures 1, 2:
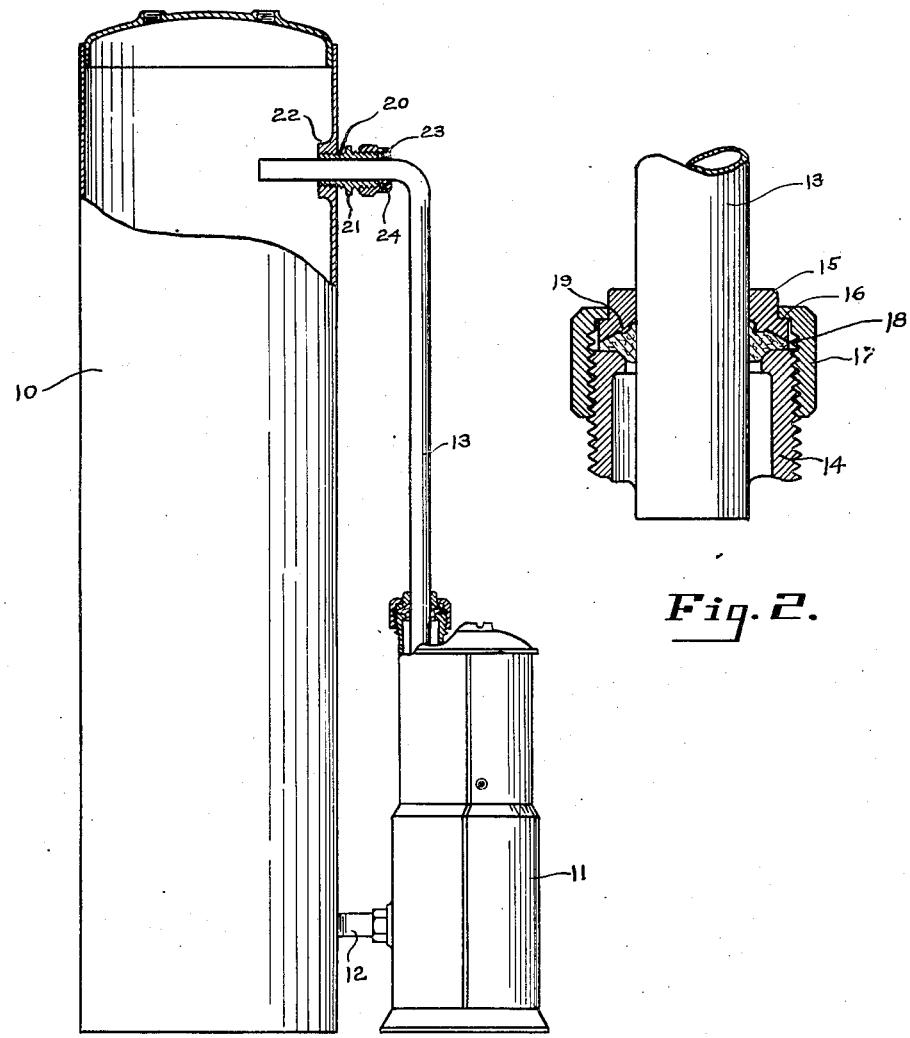

April 27, 1937.  J. A. SMITH  2,078,465
JOINT FOR CIRCULATORS
Filed April 1, 1933

Joseph A. Smith
INVENTOR.

BY William F. Swezey
his ATTORNEY.

Patented Apr. 27, 1937

2,078,465

UNITED STATES PATENT OFFICE 2,078,465

JOINT FOR CIRCULATORS

Joseph A. Smith, Cleveland, Ohio, assignor to The Cleveland Heater Company, Cleveland, Ohio, a corporation of Ohio Application April 1, 1933, Serial No. 663,995

1 Claim. (Cl. 285—122)

This invention relates to quickly detachable connections and particularly to such connections when used in combination with fluid heaters having separate storage tanks associated therewith.

It is an object of the invention to provide a means for connecting the heater to the storage tank without requiring the use of any special tools or pipe threading equipment.

A further object of the invention is to provide a connecting means which is sufficiently flexible in its construction to permit the installation of a heater with a tank without requiring any special degree of accuracy or training on the part of the person making the installation.

A still further object of the invention is to provide a connection so constructed and arranged that it may compensate for contraction and expansion due to variations in the temperature of the fluid passing through it, without being subject to leakage.

Other objects and advantages of the invention will be apparent from the following description and accompanying drawing wherein Figure 1 is a vertical view, partly in section, of a storage tank and fluid heater assembly embodying my invention, and Figure 2 is a view partly in section on an enlarged scale of the connection between the conduit and the fluid heater.

Referring to the drawing, 10 indicates a fluid storage tank and 11 indicates the fluid heater which may be heated by any suitable means such as gas, oil or electricity. A conduit 12 is provided between the tank and the heater for conducting cold fluid to the heater and a conduit 13 conducts the heated fluid from the heater to the tank.

Heretofore it has been necessary to have a skilled mechanic make the connections between the heater and the tank by accurately measuring the distance between the various inlets and outlets and then preparing the necessary pipes and unions for the connections. In the present invention, the various parts of the connecting members may be made and shipped with the heater and may be installed by anyone with the aid of a few ordinary tools.

Referring to Figure 2 for a description of a specific embodiment of the invention, 14 indicates the conventional threaded nipple of a union provided at the outlet end of the fluid pipe within the heater. Prior to the insertion of the lower end of the conduit 13 into the nipple 14, and with which nipple it may have a very loose fit as shown, a collar 15 having a shoulder 16 on which a union sleeve member 17 is detachably and rotatably mounted is slid over the end of the pipe. A pliable ring-shaped gasket 18, which may be of any suitable compressible and expansible material such as lead, is then applied to the pipe prior to the insertion of the end of the conduit into the nipple 14. This gasket is wedge-shaped in cross section and so constructed and arranged as to extend over the outer end of the nipple 14.

It will be noted that the under side of the collar 15, adjacent the gasket 18, is provided with an outwardly extending circular ridge, as indicated at 19, extending around the collar 15 adjacent its inner periphery.

The upper connection for the conduit 13 comprises a bushing type nipple 20 threaded at each end of its outer surface and provided between its ends with a flange 21 for receiving a wrench. The tank 10 is provided adjacent its upper edge with an internally threaded boss 22 within which one end of the bushing 20 may be received.

Prior to the insertion of the upper end of the conduit into the tank a collar 23 is loosely mounted on the conduit. A gasket 24, which should be of compressible material is next slid over the conduit after which the bushing 20 is applied to the conduit.

In applying the connection to the tank and the fluid heater, assuming that the various bushings, collars and gaskets have been applied as previously described, the lower end of the conduit is inserted into the nipple 14, and the conduit is then raised or lowered sufficiently to allow the insertion of the upper or bent end of the conduit through the boss 22. The conduit may then be positioned, because of the flexible character of the connection, so that the lower portion of the conduit 13 is substantially vertical. The bushing 20 is then screwed tightly into the boss 22, and the collar 23 is taken up sufficiently to compress the gasket 24 and make a water tight connection. Next the union member 17, which is internally threaded to engage the threads on the nipple 14, is screwed up tightly and thereby forces the collar 15 against the gasket 18. The ridge or protrusion 19 on the lower surface of the collar 15 presses into the gasket, and since the gasket is of a deformable material forces it to expand radially so that the base of the wedge of the gasket closely embraces the tube and forms a fluid-tight connection both with the conduit 13 and the nipple 14.

If for any reason it is required that the conduit 13 be removed it is necessary only to loosen up the collars 23 and 17.

My invention permits the use of copper, aluminum, steel or any other extruded, welded or seamless tubing to form the conduit 13, and as this tubing generally has a larger internal diameter than lead or iron pipe of the same outside diameter, fluid flow through the conduit is facilitated.

While I have shown and described this invention as particularly applicable to fluid heating it is apparent that the particular connection described may have many other applications where a threaded pipe was formerly used, and it will also be apparent that other forms of the invention might be adopted, all coming within the scope of the appended claim.

In combination, a tube; and a coupling for the tube, said coupling including a threaded nipple for receiving the tube, a pliable metallic gasket ring encircling said tube and engaging the end of the nipple, said ring being wedge shape in cross section with the wide base of the wedge facing said tube, a gasket compressing collar encircling said tube and having a face sloping substantially coincident with the angular side face of the gasket ring and having an annular ridge on said face, said annular ridge being located relatively closely adjacent the inner periphery of said sloping face of said collar, and a coupling sleeve threaded for cooperation with the nipple and having a shoulder engaging said collar for impinging the gasket ring between the collar and nipple and for causing the ridge to be forced into the material of the ring near its inner edge to spread such ring radially inwardly to seal the ring with the tube.

JOSEPH A. SMITH.